Jan. 30, 1951 W. ROBINSON 2,540,056
VALVE STRUCTURE
Original Filed March 27, 1941 3 Sheets—Sheet 1
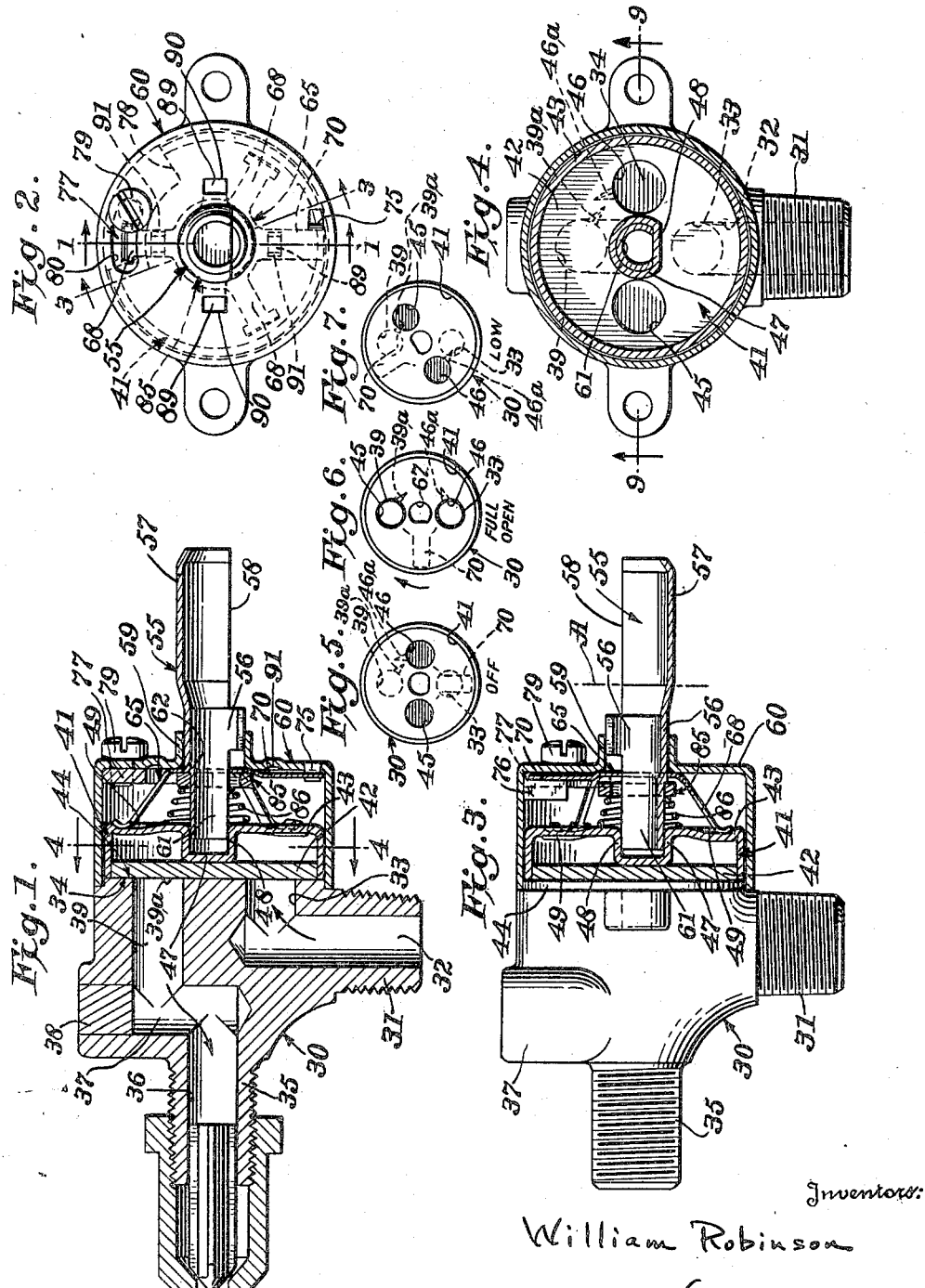
Inventor:
William Robinson
By Cushman, Darby & Cushman
Attorneys.

Jan. 30, 1951 — W. ROBINSON — 2,540,056
VALVE STRUCTURE
Original Filed March 27, 1941 — 3 Sheets-Sheet 2
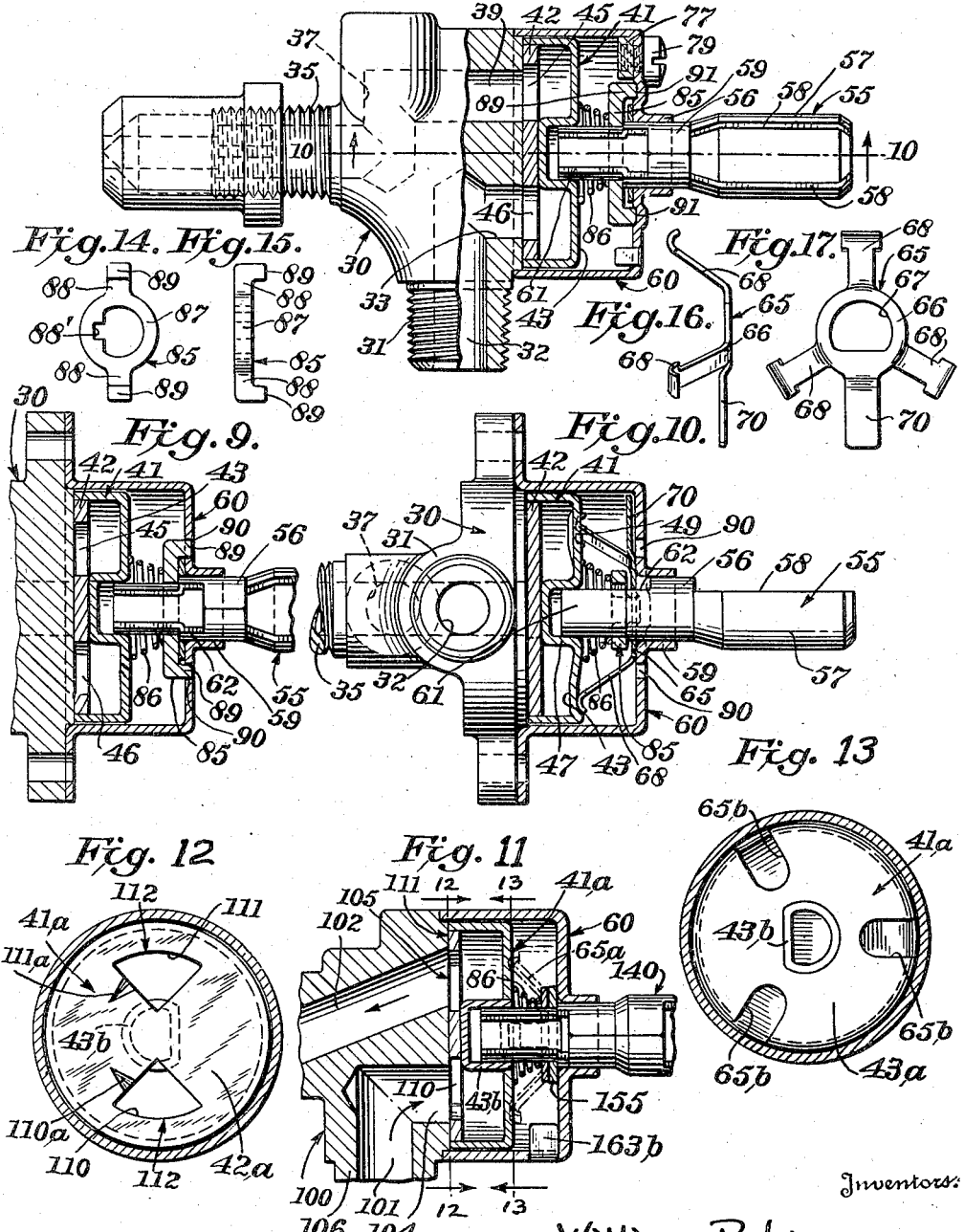
Inventor:
William Robinson
By Cushman, Darby & Cushman
Attorneys Jan. 30, 1951 W. ROBINSON 2,540,056
VALVE STRUCTURE
Original Filed March 27, 1941 3 Sheets-Sheet 3
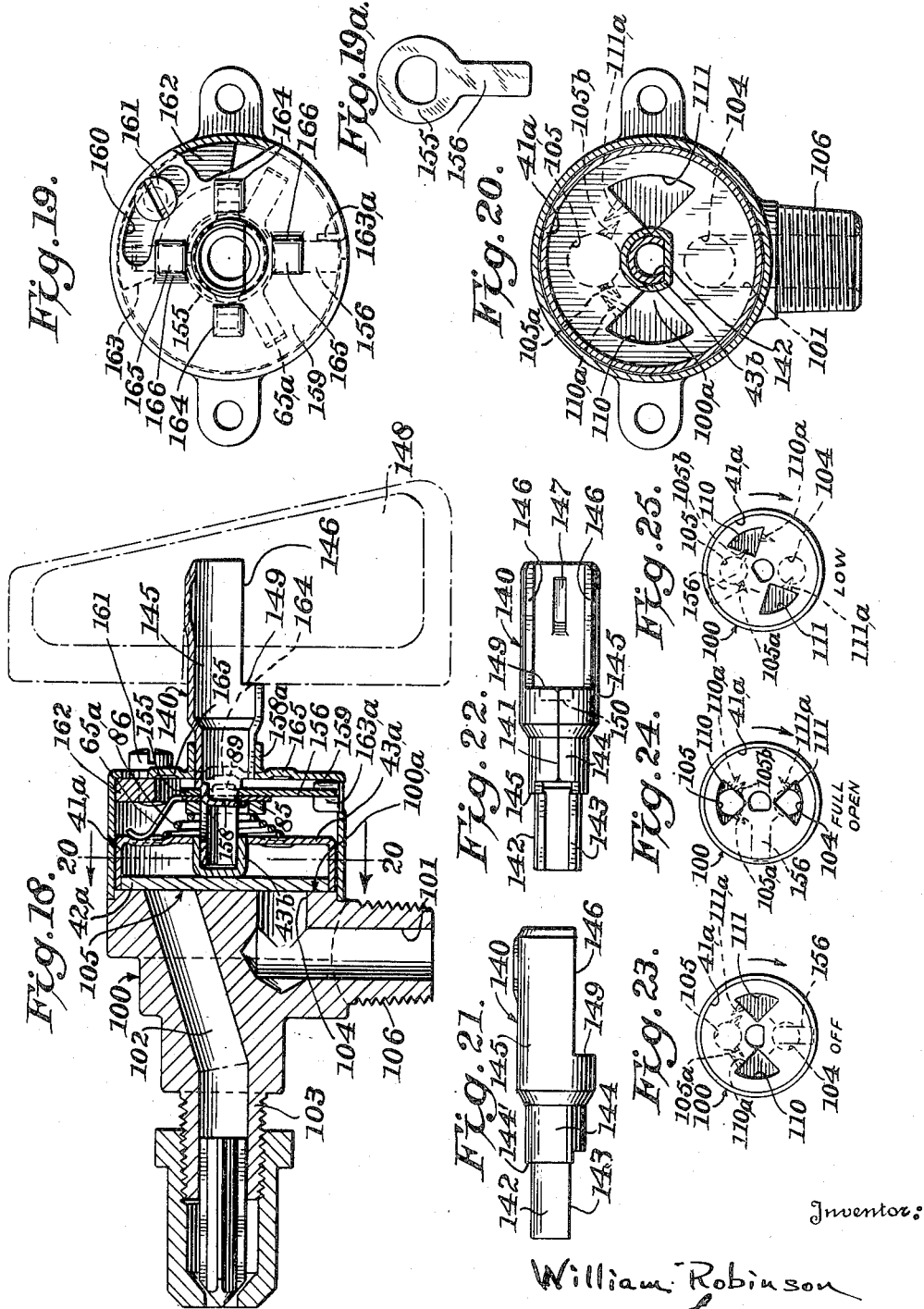
Inventor:
William Robinson
By Cushman, Darby & Cushman
Attorneys Patented Jan. 30, 1951

2,540,056

UNITED STATES PATENT OFFICE 2,540,056

VALVE STRUCTURE

William Robinson, Chicago, Ill., assignor to Certified Gas Equipment Company, Chicago, Ill., a corporation of Illinois Original application March 27, 1941, Serial No. 385,522, now Patent No. 2,361,655, dated October 31, 1944. Divided and this application March 29, 1944, Serial No. 528,589

3 Claims. (Cl. 251—90)

1

The present invention relates to valve structures. This application is a division of my application for Gas Valve Structures, Serial No. 385,522, filed March 27, 1941, now Patent No. 2,361,655, issued October 31, 1944.

The principal objects of the invention are to provide a valve structure which is highly efficient in controlling the flow of gas or other fuels and fluids; is particularly adaptable for use with both top burners and oven burners of gas ranges as well as on other gas appliances; and includes very efficient means to indicate the position of the valve element.

Other objects and advantages of the invention will be apparent from the following specification and drawings, wherein:

Figure 1 is an axial sectional view on the line 1—1 of Figure 2 with the valve element in closed position.

Figure 2 is a front view of the valve structure;

Figure 3 is a view showing the valve body element in side elevation and the valve element and stem in axial section on the line 3—3 of Figure 2, the valve element being shown in position for a low gas flow;

Figure 4 is a transverse sectional view on the line 4—4 of Figure 1, the valve element being shown in closed position;

Figures 5, 6 and 7 are diagrammatic views showing the valve element in closed, full open, and low positions, respectively;

Figure 8 is an axial section similar to Figure 1, but with the valve element shown in full open positions;

Figure 9 is an axial section on the line 9—9 of Figure 4;

Figure 10 is a bottom view of the valve body element of Figure 8, with the valve element in axial section on the line 10—10 of Figure 8;

Figure 11 is an axial section of a valve particularly useful in connection with oven burners;

Figure 12 is a transverse sectional view on the line 12—12 of Figure 11 and showing the seat face of the valve element;

Figure 13 is a transverse sectional view on the line 13—13 of Figure 11 and showing the outer surface of the valve element.

Figures 14 and 15 are front and side elevations of a lock element;

Figures 16 and 17 are side and front elevations of the valve element seating spring and stop device;

Figure 18 is an axial section of a modified form of valve structure with a handle indicated by dotted lines and the valve element in closed position, but with the stem pressed inwardly to release the locking device;

Figure 19 is an elevation of the Figure 18 structure, the view looking from the right of Figure 18;

Figure 19a is an elevation of a stop element used in the Figure 18 structure;

Figure 20 is a transverse sectional view on the line 20—20 of Figure 18 and with the valve element in closed position;

Figure 21 is an elevation of the stem shown in Figure 18;

Figure 22 is a view similar to Figure 21, but with the stem rotated 90°; and

Figures 23, 24 and 25 diagrammatically show the relation of the valve element flow ports of Figures 18 to 20 with respect to the valve body element flow ports in closed, full open, and low or simmer position.

Referring to Figures 1 to 10 and 14 to 17, the numeral 30 designates a valve body element including a threaded boss 31 through which a supply passage 32 extends, the supply passage being drilled to open to a supply port 33 extending to the planar seat face 34 of the valve body element. Boss 31 is adapted to be connected to a gas range manifold.

A boss 35 extends from the rear face of the valve body element, boss 35 being drilled to provide a passage 36 which opens to a passage 37 having its outer end closed by a plug 38. Just within the plug 38, a passage 39 extends from the seat face 34 to the bore 37. A suitable adjusting nipple may be threaded upon the outer end of the boss 35 to extend into the air mixing chamber of a gas range burner.

As is best shown in Figure 4, the supply port 33 and the delivery port 39 are positioned 180° from each other on the seat face 34 and a tapered port 39a extends from one side of the delivery port 39 in a clockwise direction and generally along a circular line.

As is described in my said original application, Serial No. 385,522, now Patent No. 2,361,655, the numeral 41 designates the valve element of Figures 1 to 10 and 14 to 17 which is hollow and formed of two stamped pieces welded together. Referring to Figures 1 and 4, the seat portion of valve element 41 is a flat disc 42 welded at its periphery to the inner edge of a circular cup-like member 43. The disc or seat member 42 has its seat face 44 flush with the edges of cup member 43, and, as best shown in Figure 4, two ports 45 and 46 are stamped from the disc member, with a tapered tailport or notch 46a extending from port 46 in a counter-clockwise direction (Figure 4) along a generally circular line. As is best indicated in Figure 4, the notch is formed at a point further spaced from the axis of the valve structure than the notch 39a of the valve body element port 39. As a result, when the valve element 41 is in the closed position shown in Figure 4, the two notches will not overlap. In other words, by having the notches spaced at different points from the valve structure axis, they may be of substantial length without necessitating an enlargement of the diameter of the structure.

Cup member 43 has a socket 47 pressed in the central portion of the same, this socket preferably having one flat side 48 to form a key. In addition, the outer face of cup member 43 has a number of depressions 49 stamped in the same, three of these depressions preferably being provided equi-distantly spaced about the axis of the valve element. The socket 47 is preferably of sufficient depth to contact with the disc 42. Socket 47 thereby braces disc 42 during planar grinding of the latter after welding.

As is best illustrated in Figures 1 to 8, a sheet metal operating stem 55 may be associated with the hollow valve element 41, stem 55 being generally of U-shaped form in cross-section with a central circular portion 56 intermediate its ends. In more detail, stem 55 includes an outer end 57 which is adapted to receive an operating handle, this portion being arcuate in cross-section or of substantially U-shaped form with its edges 58 forming a key to engage the operating handle. Portion 58 is inclined inwardly at its inner end to the circular portion 56 which is adapted to rotate within the flange 58 of a casing or plate member 60 secured to the valve body element 30 as hereinafter described, portion 56 thereby serving as the bearing or journal for the stem 55. Inwardly of circular portion 56 stem 57 is further reduced in size at its inner portion 61 and is again of open arcuate or U-shaped form. The inner portion 61 fits within the central D-shaped socket 47 of the valve element. It will be observed from Figures 9 and 10 that between circular portion 56 and the U-shaped portion 61 of less diameter, a U-shaped or arcuate portion 62 is provided, which portion is of the same diameter as circular portion 56, but has its edges lying in the same plane as the reduced diameter and U-shaped portion 61.

The provision of a stem such as 55 formed of sheet metal so as to be hollow is extremely advantageous due to the low cost at which it may be produced and, in addition, it has the very desirable attribute of permitting cooling of the valve structure due to the fact that air may flow through the hollow stem to the valve element. This is highly desirable because it insures that any grease used on the seat surface to increase the sealing qualities will not be destroyed by heat.

The inner surface of any handle applied to stem 55 will preferably terminate at the line A in Figure 3 so as to leave an opening between the handle and circular portion 56 for movement of air into and from the housing 60 and the valve element. If the valve housing 60 is covered by a range front cover plate, air can still move through the space described.

In order to hold the valve element 41 closely in engagement with the seat face 34 of valve body element 30, a spring member 65 of the form illustrated in detail in Figure 17 is provided. Member 65 includes a central portion 66 including an aperture 67 with a flattened portion to form a key. Three or more arms 68 are equidistantly spaced about the central portion and extend at an angle to the latter as illustrated in Figure 16, the ends of these legs being formed in a return bend so as to present a rounded surface. The ends of the arms may also be of greater width than the remainder of the arms. In addition, a tongue 70 extends from the central portion 66, but lies substantially in the same plane as the central portion.

Referring to Figure 1, spring member 65 is fitted upon stem 55 to have its central portion bear upon the inner surface of the forward wall or plate portion of the housing 60. The aperture 67 of spring member 65 surrounds the portion 62 of the stem; that is, the portion which is immediately outwardly of the smallest and innermost portion 61 of the stem. It will thus be observed that member 65 is concentric with stem 55 and that the stem may be moved axially of the housing 60 as hereinafter described without placing any pressure upon spring member 65 because the portion 62 of the stem will simply move through the aperture 67 of the spring member. Because of the depth of valve disc socket 47, the stem 55 will have adequate engagement therewith and can also move inwardly from the position of Figure 1.

The inner and rounded ends of the arms 68 of spring member 65 seat in the slight depressions 49 on the front face of valve element 41. In addition, a tongue 70 on the resilient element serves as a stop member. For example, as indicated in Figure 2, when the valve element 41 is in closed position, tongue 70 bears against a stop lug 75 which projects inwardly from the outer plate or wall of housing 60. Also, when the valve element is in its limit open position as hereinafter described, and which is indicated in Figures 3 and 7, tongue 70 bears against the inwardly extending face 76 of an adjustable stop element 77. Stop element 77 includes an arcuate arm 78 which carries a set screw 79 extending through an arcuate cut-out 80 in the front plate of the housing 60 to enable the stop 77 to be adjusted so as to vary the limit position of the valve element.

Means is also provided with the present valve structure to insure that the valve element 41 will be positively locked in off position and that certain intermediate positions will be indicated by a clicking sound. For this purpose, the locking element 85 illustrated in Figure 14 is mounted upon the inner portion 61 of stem 55 and is held by a spring 86 in abutment with the shoulder provided at the outer end of such portion by the portion 62 of larger diameter.

As is illustrated in Figure 14, the central portion 87 of lock member 85 has an aperture to fit portion 61 of stem 55 and the aperture includes a flattened portion so that it will rotate with the stem. The ends of the radial arms 88 of element 85 are angled to form projecting lugs 89 and the outer edges or surfaces of these lugs are flat. As shown in Figures 2 and 9, when the valve element 41 is in the closed or "off" position, the lugs 89 will extend into rectangular apertures 90 in the front plate of housing 60. As illustrated in Figure 8, when the valve element 41 is in full open position, the ends of lock arm portions 89 will engage depressions 91 on the inner surface of housing 60.

The operation of the valve to obtain various flow positions is illustrated in Figures 5 to 7. Referring to Figure 5, the valve element 41 is shown in closed position, its two ports 45 and 46 lying on a line at right angles to the line occupied by the supply port 33 and the delivery port 39 of the body element 30. At this time, the tongue 70 will be against the stop 75 as indicated in Figures 1 and 2 and the lugs 89 of lock element 85 will be seated in the apertures 90 of the housing 60 as shown in Figures 2 and 9. Also, the notches 39a and 46a lie alongside each other, but spaced so that there can be no flow between them.

Rotation of stem 55 in a clockwise direction from the Figure 5 position will cause the valve element 41 to rotate on the valve body element 30 toward the full open position diagrammatically illustrated in Figure 6. Obviously, rotation may be stopped at a number of points in advance of the Figure 6 position to thereby enable the flow of gas to be varied as desired. When the valve element 41 reaches the Figure 6 position, the ends of the arms 89 of lock member 85 will engage the depressions 91 of casing 60 as illustrated in Figure 8.

Continued rotation of valve element 41 in a clockwise direction will again reduce the flow of gas, and when element 41 reaches the position illusrated in Figure 7, the flow of gas will be such as is desirable for simmering. That is, at this time, valve element port 46 will have moved past valve body element supply port 33 so that only its notch 46a will be aligned with the supply port and valve element port 45 will have moved past valve body element delivery port 39 to such an extent that it will only be aligned with the tail port 39a. Thus, only a small flow of gas such as used for simmering can occur. At this time, the tongue 70 will engage the adjustable stop 77 as illustrated in Figure 3.

It will be observed that the valve element 41 cannot be moved directly from the Figure 5 position to that of Figure 7 without arms 89 engaging in the depressions 91. When this engagement occurs, the person operating the stove must move the valve stem inwardly to release the arms 89 from the depressions so that the valve will be free to rotate to the Figure 7 position.

The above arrangement preventing accidental movement of the valve disc directly from the Figure 5 position to that of Figure 7 is very desirable as a safety feature. More particularly, most gas burner igniting devices necessitate a full flow of gas from the burner before ignition will occur. Therefore, if the operator could move the valve directly from the off or Figure 5 position to that of Figure 7, gas could then flow from the burner without ignition by the pilot flame, and in some instances the fact that the burner was not ignited would not be noticed by the operator, as when a large pan is in position on the burner. The continued leakage of gas without ignition of the burner might result in damage.

Since the present arrangement insures that the rotation of the valve must be stopped at least temporarily at the full on position of Figure 6, proper ignition of the burner is assured. It will be understood that in order to move the valve element from the closed position of Figures 2, 5 and 9, very marked inward pressure must be exerted axially on stem 55 to release the lugs 89 from the apertures 90.

It will be noted that the limit or "low" position of the valve element can be varied by adjustment of the position of the stop 77.

Referring to Figure 18, the numeral 100 designates a valve body element including a supply passage 101 which is of angled form and opens to the planar seat face 100a through a round port 104. The delivery port 105 opening to delivery passage 102 has its center on a circular line which also passes through the center of supply port 104, but passage 102 is inclined inwardly toward the center of the valve body element 100 so that it may open to a threaded boss 103 positioned centrally of the valve body element 100. Supply port 101 opens to a threaded boss 106 extending radially from the periphery of body element 100.

As is described in my said original application, a valve element such as 41a of Figures 18 and 13 is mounted upon the valve body element 100 of Figure 18. Valve element 41a includes a round disc 42a which comprises a seat face. Disc 42a is welded at its edges to a cup-like element 43a. Element 43a differs from the element 43 of Figure 1, in that it is provided with a central aperture in which a separate socket member 43b is welded as shown in Figure 18. This structure is also illustrated in Figure 20, as well as in Figures 11 to 13. The provision of the separate socket member 43b is desirable in forming the valve disc of materials which cannot be drawn to form a socket of sufficient depth to be properly engaged by the valve operating stem. Furthermore, a socket of such depth as to contact with the disc element 42a is desirable, so that the disc and socket can be welded to brace the center portion of the disc. When the disc is thus braced, it can be more easily ground.

Valve element 41a is provided with flow ports 110 and 111 which, as best shown in Figures 20 and 12, are of sector-like form with their outer edges concentric with the axis of the valve element. However, the two side walls of the ports meet at points spaced radially outward from the axis of the valve and substantially coincidental with the outer surface of the socket member 43b. Each of the ports 110 and 111 has a notch or groove 110a and 111a, respectively, extending from one edge thereof, as also shown in Figure 12, these kerfs facing each other. As best indicated in Figure 20, the kerfs are so positioned that when the valve element 41a is in closed position, the kerfs 110a and 111a will lie substantially alongside of the kerfs 105a and 105b which extend from opposite sides of the delivery port 105 of the valve body element 100, due to the fact that the kerfs 110a and 111a are spaced further from the axis of the valve structure than the kerfs 105a and 105b.

As will be apparent from the following description, the provision of two kerfs on the valve element and two kerfs on the delivery port 105 will enable the valve element to be operated either for clockwise opening movement or counter-clockwise opening movement.

The numeral 140 designates the operating stem of the valve structure of Figures 18 to 25, which stem is preferably formed of sheet metal stamped to a circular shape with the edges of the blank contacting midway of the length of the finished stem as indicated at 141 in Figure 22. Stem 140 has its inner end 142 of sufficiently small diameter to fit within the socket member 43b, a cut-away or flattened portion 143 being provided to serve as a key in the D-shaped socket element 43b. Beyond the inner and reduced portion of the stem, there is provided a circular section 144 of larger diameter, thereby providing a shoulder 144' at the outer end of the inner portion 142. Beyond portion 144 the stem is enlarged to provide a handle receiving portion 145 and the major length of this portion is D-shaped in transverse section due to the fact that its edges 146 do not meet. In addition, an indentation 147 is provided on the D-shaped portion to assist in holding a handle such as 148 upon the stem. It will be observed that a shoulder 149 is provided by reason of the cut-away edges 146, and this shoulder limits the inward movement of the handle upon the stem as indicated in Figure 18. Due to the fact that the edges 146 are spaced apart as indicated in Figure 22, they may be readily engaged by a proper tool and spread so as to more firmly engage a handle fitted upon the stem.

If desired, an additional cut-out portion as indicated in dotted lines at 150 in Figure 22 may be formed in the shoulder 149, this cut-away portion permitting air to move through the stem to the central portion of the valve disc 41a to keep the same cool.

As has been heretofore explained, the portion 142 of stem 140 fits in the socket member 43b of valve element 41a. As shown in Figure 18, this portion of the stem also carries a stop member 155 shown in Figure 19a and which includes a radially projecting arm 156, member 155 being in abutment with the shoulder 145 of the stem. A spring 65a is positioned on the stem against stop member 155, spring member 65a being identical in form with the spring member 65 of Figures 16 and 17, except that it does not include a stop arm such as indicated at 70 in these two figures. A lock member 85 is positioned on the stem in contact with the spring member 65a, this member being identical with that illustated in Figures 14 and 15 to include projecting lugs 89, such as illustrated in the last mentioned figures. The elements 155 and 65a may be securely or immovably held upon the stem 140 by fit alone, but, in some instances, it is desirable to strike a tongue 158 from portion 142 of the stem and bend this tongue to the shape shown in Figure 18 so that its free end will engage the spring member 65a to hold the latter and stop member 155 in proper position upon the stem.

It will be noted that the tip of tongue 158 is positioned in a notch 88' (Figure 14) of lock member 85 so that the latter will not be secured against axial movement on stem 140. This will enable the lock member to move toward the valve element against the action of a coil spring 86 positioned between the lock member 85 and the outer surface of the cup-like element 43a of the disc valve.

The portion 144 of intermediate diameter of stem 140 engages a flange 158a on the cover plate or housing 159 to thereby serve as a journal for the stem. Referring to Figure 19, housing 159 includes an arcuate slot 160 through which a set screw 161 extends to engage an arcuate strip 162, the end 163 of this strip serving as a stop against which the stop arm 156 will strike when the valve disc is in the extreme low position illustrated in Figure 25. Cover plate 159 is also provided with two outwardly extending depressions 164 arranged diametrically opposite and in which the lugs 89 of lock member 85 will engage when the valve disc element is in off position. A second pair of depressions 165 are formed in the cover plate on a line extending at right angles to the line on which the depressions 164 are arranged. However, the depressions 165 differ from the depressions 164, in that one side edge of each depression 165 is inclined for a purpose.

A tongue 163a extends radially inwardly from the peripheral wall of cover plate 159 at such a point as to serve as a stop against which stop arm 156 will contact when the valve disc element is in the fully closed position of Figure 23.

Figures 23 to 25 indicate the stages of operation of the valve structure of Figures 18 to 20, comprising the valve element 41a of Figures 20, 12 and 13 and the valve body element 100 of Figure 18. Referring to Figure 23, valve element 41a is there shown in closed position with its ports 111 and 110 out of communication with the valve body element ports 104 and 105 and with the port notches relatively positioned in the manner described above. Also, at this time, the stop arm 156 will be in engagement with the stop tongue 163a as is also shown in Figures 18 and 19.

By pressing the valve stem 140 inwardly to the position indicated in Figure 18, the lugs 89 of stop member 85 will be disengaged from the depressions 164, so that the valve element may be rotated. This inward pressure upon the valve stem will, of course, contract the locking element spring 86 and also the spring element 65a, both as indicated in Figure 18. However, because of the fact that the pockets 65b in which the ends of the arm 65a seat are quite shallow, in fact, only about one quarter the depth of the corresponding pockets 49 of the Figure 1 structure, and also because the ends of the arms 65a are rounded as has been described in connection with the Figure 1 structure, the arms 65a will readily ride radially outwardly as the stem is pushed inwardly.

Rotation of the valve element in a clockwise direction with respect to Figures 19, 20 and 23 will move it to the full open position illustrated in Figure 24, wherein the ports of the valve element and valve body element are fully aligned. In finally reaching this position, the locking lugs 89 of lock member 85 will ride down along the inclined edges 166 of the depressions 165 and into these depressions so as to abut against the opposite and straight walls of the latter. The operator will thereby have an indication that the valve is in full open position for ignition of the burner by the pilot device. In addition, the operator must again force the stem inwardly against the spring pressure before the valve can be turned to the Figure 25 low position. By this arrangement, the valve is certain to stay in a full open position for ignition of the burner before it can be turned to the low position of Figure 25.

Figure 25 illustrates the valve element 41a in the low or simmer position and with the stop arm 156 in contact with the surface 163 of the stop member 162. In this position, port 111 of the valve element has moved past supply port 104 and only receives gas from the latter through the notch 111a. Also, valve element port 110 has moved entirely past delivery port 105 and gas only flows through the notch 105b. The extreme low position can be adjusted by adjustment of the stop strip 162.

Referring to Figure 11, the valve structure there illustrated is particularly designed for use with oven burners, but includes a valve element 41a such as shown in use with the Figure 18 assembly, and which valve element is illustrated in detail in Figure 20. The Figure 26 assembly also includes the valve body element 100 used with the Figure 18 assembly and shown in detail in Figures 29 to 31.

In the Figure 11 assembly, the valve element 41a only moves between "off" and full "on" positions and its stem 140, which is similar to that shown in Figures 21 and 22, carries a stop 155 shown in Figure 19a and including an arm 156. In "off" position of the valve, arm 156 will contact with a tongue 163b projecting inwardly from the housing 60. In full "on" position, such as shown in Figure 11, arm 156 will contact with a stop similar to 163b, but positioned 90° around the housing.

A spring 65a is positioned between member 155 and the outer surface of valve element 41a to hold the latter seated.

The terminology used in the specification is for the purpose of description and not of limitation, the scope of the invention being indicated in the claims.

I claim:

1. A valve comprising a valve body element including a seat portion, a valve element rotatable with respect to the seat portion, the valve body element and valve element having ports therein adapted to be aligned for flow upon rotation of the valve element, a plate member secured to the valve body element and mounted outwardly of the valve element, the plate member including a circular aperture concentric with the valve element, a stem extending through the aperture and engaging the valve element for axial movement with respect to the latter, a resilient member between the plate member and the adjacent face of the valve element, said resilient member being mounted to rotate with and have movement axially of the stem, said stem including a shoulder inwardly of said plate member, a lock member carried inwardly of the shoulder, spring means between the valve element and the lock member to hold the latter against said shoulder, and cooperating locking means carried by said plate member and lock member.

2. A valve comprising a valve body element including a seat portion, a valve element rotatable with respect to the seat portion, the valve body element and valve element having ports therein adapted to be aligned for flow upon rotation of the valve element, a plate member secured to the valve body element and mounted outwardly of the valve element, the plate member including a circular aperture concentric with the valve element, a stem extending through the aperture and engaging the valve element for axial movement with respect to the latter, a resilient member between the plate member and the adjacent face of the valve element, said resilient member being mounted to rotate with and have movement axially of the stem, said stem including a shoulder inwardly of said plate member, a lock member carried inwardly of the shoulder, spring means between the valve element and the lock member to hold the latter against said shoulder, cooperating locking means carried by said plate member and lock member, a radially projecting arm on said resilient member, and means carried by said plate member adapted to be engaged by said arm to limit rotation of the valve element.

3. A valve comprising a valve body element including a seat portion, a valve element rotatable with respect to the seat portion, the valve body element and valve element having ports therein adapted to be aligned for flow upon rotation of the valve element, a plate member secured to the valve body element and mounted outwardly of the valve element, said plate member including a circular aperture, a hollow stem extending through the aperture and engaging the valve element, a stop member carried by said stem, said stem having a tongue stuck from its wall and bent to form a diametrically extending tang to secure the stop member against movement with respect to the stem, a resilient member between the stop member and the adjacent face of the valve element, and stop means carried by said plate member and adapted to cooperate with said stop member.

WILLIAM ROBINSON.

REFERENCES CITED

The following references are of record in the file of this patent:

UNITED STATES PATENTS

| Number | Name | Date |
|---|---|---|
| 1,111,865 | Serrell | Sept. 29, 1914 |
| 1,786,330 | Berkeley | Dec. 23, 1930 |
| 1,933,177 | Kindl | Oct. 31, 1933 |
| 1,937,325 | Pick | Nov. 28, 1933 |
| 2,030,150 | Mueller | Feb. 11, 1936 |
| 2,083,086 | Pratt | June 8, 1937 |
| 2,129,816 | Byars | Sept. 13, 1938 |
| 2,160,358 | Harper | May 30, 1939 |
| 2,300,961 | Pratt | Nov. 3, 1942 |

FOREIGN PATENTS

| Number | Country | Date |
|---|---|---|
| 18,595 | Great Britain | Aug. 6, 1910 |
| 688,663 | France | May 13, 1930 |